(12) United States Patent
Feuerstack et al.

(10) Patent No.: US 9,350,053 B2
(45) Date of Patent: May 24, 2016

(54) ENERGY STORAGE DEVICE WITH HEATING DEVICE AND METHOD FOR HEATING ENERGY CELLS OF AN ENERGY STORAGE DEVICE

(75) Inventors: Peter Feuerstack, Ludwigsburg (DE); Erik Weissenborn, Stuttgart (DE); Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 59 days.

(21) Appl. No.: 14/124,844

(22) PCT Filed: Apr. 12, 2012

(86) PCT No.: PCT/EP2012/056657
§ 371 (c)(1),
(2), (4) Date: Dec. 9, 2013

(87) PCT Pub. No.: WO2012/167973
PCT Pub. Date: Dec. 13, 2012

(65) Prior Publication Data
US 2014/0099523 A1   Apr. 10, 2014

(30) Foreign Application Priority Data

Jun. 9, 2011   (DE) .................... 10 2011 077 264

(51) Int. Cl.
*H01M 10/42* (2006.01)
*H01M 10/637* (2014.01)
(Continued)

(52) U.S. Cl.
CPC ........ *H01M 10/5026* (2013.01); *H01M 10/425* (2013.01); *H01M 10/441* (2013.01);
(Continued)

(58) Field of Classification Search
None
See application file for complete search history.

(56) References Cited

U.S. PATENT DOCUMENTS

| 5,642,275 A | 6/1997 | Peng et al. |
| 2009/0253028 A1* | 10/2009 | Takagi ............................ 429/62 |
| 2010/0089547 A1* | 4/2010 | King et al. ...................... 165/42 |

FOREIGN PATENT DOCUMENTS

| DE | 4422005 | 12/1995 |
| EP | 0609101 | 8/1994 |

(Continued)

OTHER PUBLICATIONS

International Search Report for Application No. PCT/EP2012/056657 dated Jul. 23, 2012 (3 pages).

*Primary Examiner* — Patrick Ryan
*Assistant Examiner* — Wyatt McConnell
(74) *Attorney, Agent, or Firm* — Michael Best & Friedrich LLP

(57) ABSTRACT

The invention relates to an energy storage device (1) for generating an n-phase supply voltage for an electric machine (2), wherein n≥1, with n energy supply branches which are connected in parallel and which can each be connected to one of n phase conductors (2a, 2b, 2c), wherein each of the energy supply branches has a large number of energy storage modules (1a, 1b) which are connected in series and which each comprise: an energy storage cell module (5, 7) which has at least one energy storage cell (5a, 7a) and a coupling device (3), which is designed to connect the energy storage cell module (5, 7) selectively into the respective energy supply branch or to bridge said energy storage cell module, wherein in each case at least one of the energy storage modules (1b) also has in each case one heating element (8) for the at least one energy storage cell (7a); and a heating device (9), which is connected to the heating elements (8) and which is designed to actuate the heating elements (8) for heating the energy storage cells (7a) in the groups of energy storage modules (1b).

13 Claims, 1 Drawing Sheet

(51) Int. Cl.
*H01M 10/44* (2006.01)
*H01M 10/48* (2006.01)
*H01M 10/63* (2014.01)
*H01M 10/615* (2014.01)
*H01M 10/6571* (2014.01)
*H01M 10/0525* (2010.01)

(52) U.S. Cl.
CPC .......... *H01M10/486* (2013.01); *H01M 10/615* (2015.04); *H01M 10/63* (2015.04); *H01M 10/637* (2015.04); *H01M 10/6571* (2015.04); *H01M 10/0525* (2013.01); *Y02T 10/7011* (2013.01)

(56) References Cited

FOREIGN PATENT DOCUMENTS

| | | |
|---|---|---|
| JP | 2008109841 | 5/2008 |
| WO | 2011/016497 | 2/2011 |

\* cited by examiner

ENERGY STORAGE DEVICE WITH HEATING DEVICE AND METHOD FOR HEATING ENERGY CELLS OF AN ENERGY STORAGE DEVICE

BACKGROUND OF THE INVENTION

The invention relates to a heating device for an energy storage device, in particular in a battery direct converter circuit for supplying power to electric machines, and to a method for heating energy cells of an energy storage device, in particular when starting an electrically driven vehicle.

The trend is that in the future electronic systems which combine new energy storage technologies with electrical drive technology will be used increasingly both in stationary applications, such as wind power installations or solar installations, and in vehicles, such as hybrid or electric vehicles.

FIG. 1 shows, by way of example, the feeding-in of alternating current into a three-phase electric machine 101. In this case, a DC voltage provided from a DC voltage intermediate circuit 103 is converted into a three-phase AC voltage by a converter in the form of a pulse-controlled inverter 102. The DC voltage intermediate circuit 103 is fed by a line 104 of battery modules 105 connected in series. In order to be able to meet the requirements for power and energy given for a respective application, a plurality of battery modules 105 is often connected in series in a traction battery 104. An energy storage system of this type is often used in electrically driven vehicles, for example.

The series circuit comprising a plurality of battery modules is associated with the problem that the entire line fails when a single battery module fails. Such a failure of the energy supply line can result in failure of the entire system. Furthermore, temporarily or permanently occurring power reductions of an individual battery module can result in power reductions in the entire energy supply line.

Document U.S. Pat. No. 5,642,275 A1 describes a battery system with an integrated inverter function. Systems of this type are known under the name multilevel cascaded inverter or else battery direct inverter (BDI). Such systems comprise DC sources in a plurality of energy storage module lines, which can be connected directly to an electric machine or an electrical power supply system. In this case, single-phase or polyphase supply voltages can be generated. The energy storage module lines in this case have a plurality of energy storage modules which are connected in series, wherein each energy storage module has at least one battery cell and an associated controllable coupling unit, which makes it possible to interrupt the respective energy storage module line or to bypass the respectively associated at least one battery cell or to switch the respectively associated at least one battery cell into the respective energy storage module line, depending on control signals. By suitable driving of the coupling units, for example with the aid of pulse-width modulation, suitable phase signals for controlling the phase output voltage can also be provided, with the result that there is no need for a separate pulse-controlled inverter. The pulse-controlled inverter required for controlling the phase output voltage is therefore integrated in the BDI, so to speak.

BDIs generally have a higher degree of efficiency and higher degree of fail-safety in comparison with conventional systems, as shown in FIG. 1. The fail-safety is ensured, inter alia, by virtue of the fact that defective, failed or not fully effective battery cells can be disconnected from the energy supply lines by suitable bypass driving of the coupling units.

In the case of the two systems, both in the case of the system shown in FIG. 1 and in the case of a BDI, precisely when in use in electrically driven vehicles, it may happen that the battery cells are to be operated at low ambient temperatures, for example in winter. Conventional batteries, for instance lithium-ion batteries, have an internal resistance which is dependent on temperature. At low temperatures, the internal resistance is increased and so the full power cannot be taken from the battery under certain circumstances. Therefore, at low ambient temperatures, depending on the composition of the battery cells used, a preconditioning of the battery cells must take place, that is to say, the battery cells must be warmed so that the power required for driving, in particular for starting-up, can be provided. The heating-up process in this case is energy-intensive and time-consuming.

SUMMARY OF THE INVENTION

In accordance with one embodiment, the present invention provides an energy storage device for generating an n-phase supply voltage for an electric machine, wherein n≥1, having n energy supply branches, which are connected in parallel and can be connected in each case to one of n phase conductors, wherein each of the energy supply branches has a multiplicity of energy storage modules, which are connected in series and in each case comprise:

an energy storage cell module, which has at least one energy storage cell, and a coupling device, which is designed to selectively switch the energy storage cell module into the respective energy supply branch or to bypass said module, wherein in each case at least one group of energy storage modules in an energy supply branch also has in each case one heating element for the at least one energy storage cell; and a heating device, which is connected to the heating elements and is designed to control the heating elements in order to heat the energy storage cells of the groups of energy storage modules.

In accordance with another embodiment, the present invention provides a system, having an energy storage device of the invention, an n-phase electric machine, wherein n≥1, the phase conductors of which are connected to phase connections of the energy storage device, and a control device, which is designed to selectively control the coupling devices of the energy storage modules in order to generate a supply voltage for the electric machine.

In accordance with another embodiment, the present invention provides a method for heating energy cells of an energy storage device of the invention, having the steps of detecting the temperature of the energy cells of the energy storage device, and controlling the heating elements of the groups of energy storage modules by means of the heating device depending on the detected temperature in order to heat the energy cells of the groups of energy storage modules.

One concept of the present invention is to reduce the energy and time demands for warming energy cells of energy storage devices in order to precondition the energy cells, by using an energy storage device with individually connectable energy storage modules, in which only a subset of the available energy cells are preheated. The energy necessary for this is now only a fraction of the energy required to warm the entire energy storage device. Similarly, only a relatively small period of time is necessary for warming the subset of the energy cells. The preheated energy cells can then be advantageously used for initial energy supply by means of the energy storage device, for example during a starting-up process of an electric vehicle driven using the energy storage device.

A further concept of the present invention is to identify a subset of the energy cells of an energy storage device as dedicated energy cells for an initial energy supply, for example during a starting-up process of an electric vehicle driven using the energy storage device. The dedicated subset of the energy cells can then preferably have battery cells which have a particularly low internal resistance at low temperatures in order to be able to avoid heating-up, or at least to minimize the energy and time demands when heating this subset of the energy cells.

BRIEF DESCRIPTION OF THE DRAWINGS

Further features and advantages of embodiments of the invention arise from the following description with reference to the appended figures.

In the drawings.

DETAILED DESCRIPTION

Figure 1:
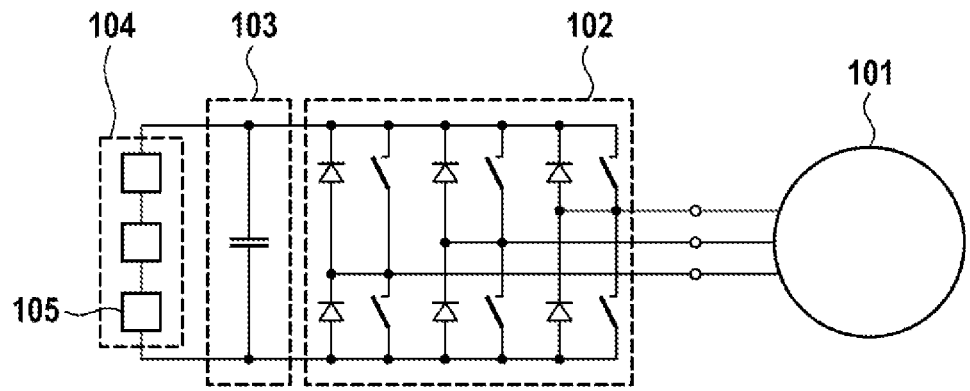
FIG. 1 shows a schematic illustration of a voltage supply system for a three-phase electric machine.
Figure 2:
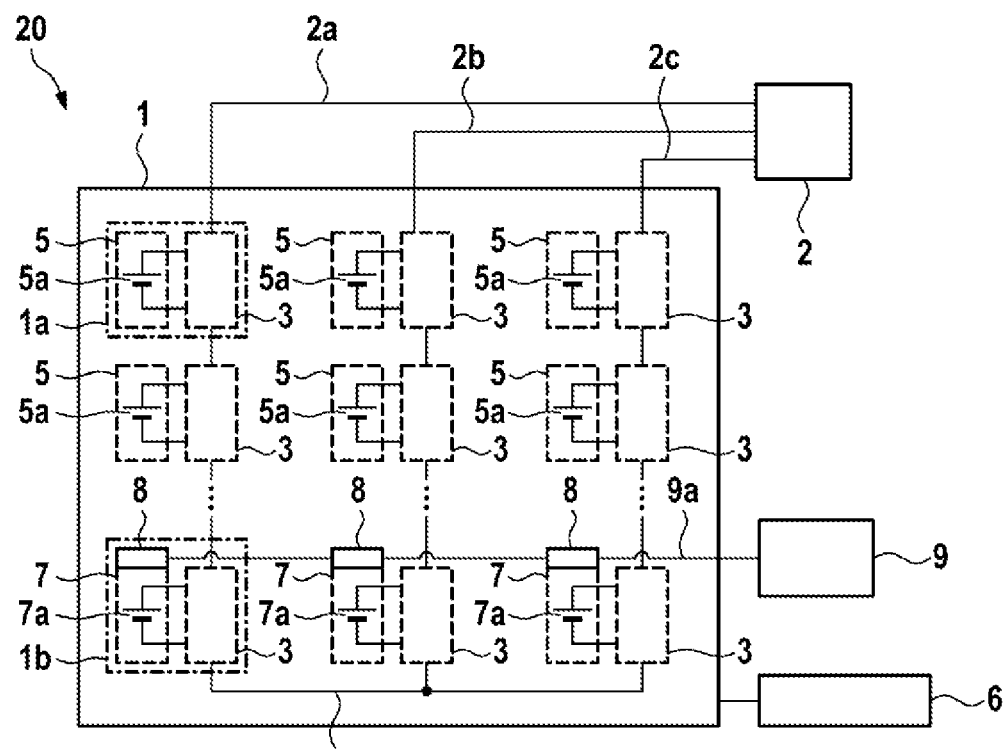
FIG. 2 shows a schematic illustration of a system having an energy storage device and a heating device according to one embodiment of the present invention.

FIG. 2 shows a system 20 for voltage conversion of DC voltage supplied by means of energy storage modules 1a, 1b into an n-phase AC voltage. The system 20 comprises an energy storage device 1 having energy storage modules 1a, 1b, which are connected in series in energy supply branches. By way of example, three energy supply branches are shown in FIG. 2, which energy supply branches are suitable for generating a three-phase AC voltage, for example for a three-phase machine 2. In principle, however, any other number of phases n is likewise possible. The energy storage device 1 has a phase connection at each energy supply branch, which phase connections can be connected in each case to phase conductors 2a, 2b, 2c and are connected to the phase conductors 2a, 2b, 2c for example for the operation of, for example, an electric machine. By way of example, the system 20 in FIG. 2 is used to feed an electric machine 2, in particular in an electrically driven vehicle. However, it can also be provided that the energy storage device 1 is used to generate electrical current for an energy supply network 2.

The system 20 can also comprise a control device 6 which is connected to the energy storage device 1 and by means of which the energy storage device 1 can be controlled in order to provide the desired output voltages at the respective phase connections for the phase conductors 2a, 2b, 2c.

The energy supply branches can be connected at the ends thereof to a reference potential 4 (reference rail) which conducts a medium potential relative to the phase conductors 2a, 2b, 2c of the electric machine 2 in the illustrated embodiment. The reference potential 4 can be a ground potential, for example. Each of the energy supply branches has at least two energy storage modules 1a, 1b, which are connected in series. By way of example, the number of energy storage modules 1a, 1b per energy supply branch in FIG. 2 is three, any other number of energy storage modules 1a, 1b also being possible, however. In this case, each of the energy supply branches preferably comprises the same number of energy storage modules 1a, 1b, it also being possible, however, for a different number of energy storage modules 1a, 1b to be provided for each energy supply branch. For the sake of clarity, only two of the energy storage modules with reference signs 1a and 1b are indicated, wherein the rest of the energy storage modules can be designated in a corresponding manner, however.

The energy storage modules 1a, 1b comprise in each case a coupling device 3 having a plurality of coupling elements (not shown). The energy storage modules 1a, 1b also comprise in each case an energy storage cell module 5 or 7 having at least one energy storage cell 5a or 7a. In this case, it can also be provided that a plurality of energy storage cells 5a or 7a are connected in series in an energy storage cell module 5 or 7.

The energy storage cell modules 5 are connected to input connections of the associated coupling devices 3 via connection lines. The coupling devices 3 can be formed, for example, as full-bridge circuits with four coupling elements or as half-bridge circuits with two coupling elements. In this case, the coupling elements can have in each case semiconductor switches, for instance field-effect transistors (FETs). The coupling elements can be embodied as power semiconductor switches, for example in the form of IGBTs (insulated gate bipolar transistors), JFETs (junction field-effect transistors) or as MOSFETs (metal oxide semiconductor field-effect transistors).

The coupling devices 3 can be controlled in such a way, for example by means of the control device 6, that the energy storage cell modules 5 or 7 are selectively switched between the output connections of the energy storage modules 1a, 1b or that the energy storage cell modules 5 and 7 are bypassed. By means of suitable control of the coupling devices 3, individual energy storage cell modules 5 or 7 of the energy storage modules 1a, 1b can therefore be integrated in a targeted manner into the series circuit of an energy supply branch.

In this case, the energy storage cell modules 5 and 7 have energy cells 5a and 7a, for example lithium-ion batteries. Said lithium-ion batteries can be conventional lithium-ion batteries, for example, which have a substantially higher internal resistance $R_I$ (output resistance) at a low operating temperature that at a high operating temperature. For example, the internal resistance $R_I$ of a conventional lithium-ion battery at a temperature of −10° C. is approximately ten times higher than at a temperature of 25° C.

In another embodiment however, a group of energy storage cell modules 7, which in each case is arranged in each of the energy supply branches, can have energy cells 7a, which are specially formed power cells that have a significantly lower internal resistance $R_I$ below a predefined temperature threshold value than the conventional energy cells 5a, for example being conventional lithium-ion batteries.

The energy storage modules 1b differ from the energy storage modules 1a in that in each case a heating element 8 is additionally arranged in the energy storage modules 1b having the specially formed power cells. The heating element 8 can be, for example, a PTC thermistor, for example made of a ceramic material such as barium titanate. The heating element 8 can also be manufactured on the basis of doped silicon. It can also be provided that the heating elements 8 have windings of common heating wires. The heating elements 8 of the energy storage modules 1b are arranged close to the energy cells 7a and can be controlled by a heating device 9. The heating device 9 is configured to detect the temperature T, for example the operating temperature, of the energy cells 7a and, depending on the detected temperature T, to control the heating elements 8. The number of energy storage modules 1b per energy supply branch is not limited here, for example at least one energy storage module 1b can be provided per energy supply branch.

At comparatively low temperatures, for example in winter, the ambient temperatures can be so low that a system 20 which is used for the drive of an electric vehicle or a hybrid vehicle must be preheated. For this purpose, the heating device 9 controls the heating elements 8 in such a way that the energy cells 7a are warmed until the temperatures T thereof have reached an operating temperature threshold at which the energy cells 7a have a sufficiently low internal resistance $R_I$. Since the energy cells 7a, in contrast to the energy cells 5a, are correspondingly embodied power cells having comparatively low internal resistance $R_I$, the energy and time demands for heating the energy cells 7a by means of the heating elements 8 are correspondingly low. Furthermore, advantageously only the energy storage modules 1b are provided with heating elements 8 and so not all of the energy cells 5a and 7a of the energy storage device 1 must be warmed, rather only the dedicated subset of energy cells 7a of the energy storage modules 1b. As a result, the thermal energy requirement needed for warming the energy cells 7a can be reduced.

It is possible in this case to use the group of energy storage cell modules 7 when the electric machine 2 connected to the energy storage device 1 has a high power requirement at a low output voltage. In this case, it can be provided that only the energy cells 7a of the group of energy storage cell modules 7 are used for generating the output voltage of the energy storage device 1.

Figure 3:
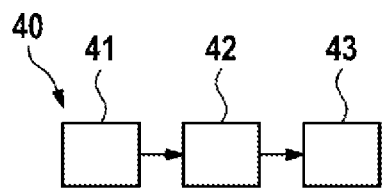
FIG. 3 shows a schematic illustration of a method for heating energy cells of an energy storage device according to another embodiment of the present invention.

FIG. 3 shows a schematic illustration of an exemplary method 40 for heating the energy cells 7a of the energy storage device 1 and for subsequently generating a supply voltage with the energy storage device 1. In a first step 41, the temperature T of the energy cells 5a and 7a is detected. If the temperature T is above a certain predefined temperature threshold value, it is not necessary to differentiate between the energy storage modules 1a and 1b since all of the energy cells 5a and 7a have an equally sufficiently low internal resistance $R_I$. In this case, the energy storage device 1 can be operated as normal.

By way of example, the temperature T in winter for the use of an energy storage device 1 in an electrically driven vehicle can be relatively low, however. At low temperatures, the energy cells 5a and 7a have an internal resistance $R_I$ which is above an acceptable threshold and so a sufficiently good power output cannot be ensured.

In this case, it can be provided in a second step 42 that the heating device 9 controls the heating elements 8 in such a way that the energy cells 7a of the energy storage modules 1b are heated. As soon as the temperature T of the energy cells 7a is above the temperature threshold value, the energy cells 7a of the group of energy storage modules 1b are ready for operation, while the energy cells 5a, which were not warmed, of the remaining energy storage modules 1a are not yet ready for operation.

In particular during start processes of an electrically driven vehicle, for example when starting-up, high currents but only low supply voltages are necessary. Therefore it can be determined in the second step 42 whether it is sufficient to generate the supply voltage of the energy storage device 1 using only the output voltages of a subset of the energy cells 7a, that is to say, whether the current demand of the electric machine 2 is above a predefined current-demand threshold value.

If this is the case, it is possible in a third step 43 for the control device 6 to control the coupling devices 3 of those energy storage modules 1b per energy supply branch which are configured with the already warmed energy cells 7a. The remaining energy storage modules 1a are not used to generate the supply voltage of the energy storage device 1 in this case. Only once the start process or starting-up process has ended can the energy cells 5a of the first group of energy storage modules 1a be included again in generating the supply voltage, if the energy cells 5a have reached a sufficiently high operating temperature during the operation of the energy storage device 1.

The invention claimed is:

1. An energy storage device for generating an n-phase supply voltage for an electric machine, wherein n ≥ 1, the energy storage device comprising:
    n energy supply branches, which are connected in parallel and can be connected in each case to one of n phase conductors, wherein each of the energy supply branches has a multiplicity of energy storage modules, which are connected in series, each of the energy storage modules including
        an energy storage cell module, which has at least one energy storage cell, and
        a coupling device, which is designed to selectively switch the energy storage cell module into the respective energy supply branch or to bypass said module,
        wherein at least one of the energy storage modules also has one heating element, the one heating element configured to heat only one energy storage module,
        wherein at least one of the energy storage modules does not include a heating element; and
    a heating device, which is connected to the heating elements and is designed to control the heating elements in order to heat the at least one energy storage cell of the energy storage cell modules of each energy supply branch, and
    wherein the coupling devices of each of the plurality of energy storage modules are configured to switch the at least one energy storage module having the one heating element into its respective energy supply branch and to bypass the energy storage modules that do not include a heating element in response to a condition being detected.

2. The energy storage device as claimed in claim 1, wherein the heating elements comprise PTC thermistors.

3. The energy storage device as claimed in claim 1, wherein, below a predefined temperature threshold value, the at least one energy storage cell of the energy storage cell modules of each energy supply branch have a lower internal resistance than the at least one energy storage cell of the other energy storage modules.

4. A system having:
    an energy storage device as claimed in claim 1;
    an n-phase electric machine, wherein n ≥ 1, the phase conductors of which are connected to phase connections of the energy storage device; and
    a control device, which is designed to selectively control the coupling device of each of the energy storage modules in order to generate a supply voltage for the electric machine.

5. A method for heating energy cells of an energy storage device as claimed in claim 1, having the steps of:
    detecting the temperature of the at least one energy cell of the energy storage cell modules of the energy storage device; and
    controlling the heating elements of the energy storage cell modules of each energy supply branch by means of the heating device depending on the detected temperature in order to heat the at least one energy cell of the energy storage cell modules of each energy supply branch.

6. The method as claimed in claim 5, further comprising the step of:
    controlling the coupling device of the energy storage cell modules of each energy supply branch in order to generate a supply voltage on the phase conductors of an electric machine from output voltages of only heated energy cells, when the temperature of the heated energy cells exceeds a predefined temperature threshold value.

7. The method as claimed in claim 6, wherein the step of controlling the coupling device of the energy storage modules is performed when the current demand of the electric machine exceeds a predefined current-demand threshold value.

8. The energy storage device as claimed in claim 1, wherein the heating device activates the heating elements when the temperature of the energy storage cells is below a threshold value.

9. An energy storage device for generating an n-phase supply voltage for an electric machine, wherein n ≥1, the energy storage device comprising:
   n energy supply branches connected in parallel and operable to be connected to one of n phase conductors, each energy supply branch including a first energy storage module and a second energy storage module;
   a control device; and
   a heating device,
   wherein the first energy storage module and the second energy storage module each have an energy storage cell and a coupling device coupled to the control device,
   wherein the first energy storage module does not include a heating element,
   wherein the second energy storage module includes a heating element coupled to the heating device, and
   wherein the control device is configured to
      determine when a condition is present,
      operate the coupling device of the first energy storage module of each energy supply branch to bypass the first energy storage modules in response to determining that the condition is present, and
      operate the coupling device of the second energy storage module of each energy supply branch to switch the second energy storage modules into each respective energy supply branch in response to determining that the condition is present.

10. The energy storage device as claimed in claim 9, wherein the heating element of each second storage module is configured to heat only the second energy storage module.

11. An energy storage device for generating an n-phase supply voltage for an electric machine, wherein n ≥1, the energy storage device comprising:
   n energy supply branches connected in parallel and operable to be connected to one of n phase conductors, each energy supply branch including a first energy storage module and a second energy storage module;
   a control device; and
   a heating device,
   wherein the first energy storage module and the second energy storage module each have an energy storage cell and a coupling device coupled to the control device,
   wherein the second energy storage module includes a heating element coupled to the heating device, and
   wherein during a start process for an electrically driven vehicle, it is determined if the current demand of the electrically driven vehicle is above a predetermined threshold, and if the current demand is above the predetermined threshold, only output voltages of the second energy storage modules are used.

12. The energy storage device as claimed in claim 11, wherein the controller prevents using output voltages of the first energy storage modules so that only the output voltages of the second energy storage modules are used.

13. The energy storage device as claimed in claim 11, wherein once the start process for the electrically driven vehicle has ended and if the first energy storage module has reached a sufficiently high operating temperature, output voltages of the first energy storage module are included.

* * * * *